(12) United States Patent
Saijo et al.

(10) Patent No.: US 6,250,543 B1
(45) Date of Patent: Jun. 26, 2001

(54) CONTAINER OF GABLED ROOF TYPE HAVING TOP SEAL RIB AND TOP SEALING DEVICE THEREFOR

(75) Inventors: Yoshihiro Saijo; Shigeru Ueda; Michio Ueda, all of Tokushima (JP)

(73) Assignee: Shikoku Kakoki Co., LTD, Tokushima (JP)

( * ) Notice: Subject to any disclaimer, the term of this patent is extended or adjusted under 35 U.S.C. 154(b) by 0 days.

(21) Appl. No.: 09/427,184

(22) Filed: Oct. 26, 1999

(30) Foreign Application Priority Data

Oct. 28, 1998 (JP) .................................................. 10-306513

(51) Int. Cl.⁷ ....................................................... B65D 5/08
(52) U.S. Cl. ..................... 229/125.42; 229/137; 229/5.8; 53/376.6; 206/459; 116/205

(58) Field of Search ................................ 229/137, 125.42, 229/3.1; 53/376.6, 375.9, 477, 491; 116/205; 206/459

(56) References Cited

U.S. PATENT DOCUMENTS

| | | | | |
|---|---|---|---|---|
| 4,946,041 | * | 8/1990 | Poole | 229/125.42 X |
| 5,501,394 | * | 3/1996 | Eno | 229/125.42 X |
| 5,503,327 | * | 4/1996 | Barnes | 229/125.42 X |
| 5,564,621 | * | 10/1996 | Writt | 229/125.42 X |

* cited by examiner

*Primary Examiner*—Allan N. Shoap
*Assistant Examiner*—Tri M. Mai
(74) *Attorney, Agent, or Firm*—Armstrong, Westerman, Hattori, McLeland, & Naughton, LLP

(57) ABSTRACT

A container of the gabled roof type has a top seal rib and a spout identifying mark formed on a side face of the rib at an end portion thereof providing a spout. The mark comprises cavities and/or protrusions which are tactually perceivable.

1 Claim, 3 Drawing Sheets

CONTAINER OF GABLED ROOF TYPE HAVING TOP SEAL RIB AND TOP SEALING DEVICE THEREFOR

BACKGROUND OF THE INVENTION

The present invention relates to containers of the gabled roof type having a top seal rib for use in packaging aging milk or the like, and a top sealing device for such containers.

Containers of the type mentioned are already known which bear a spout identifying mark printed on a side face of the top seal rib at one end portion thereof providing a spout.

Visually handicapped people are unable to read the mark on the container and therefore fail to recognize which end of the rib provides the spout.

SUMMARY OF THE INVENTION

An object of the present invention is to provide a container of the gabled roof type having a top seal rib which enables even a visually handicapped person to readily recognize which end of the rib provides a spout, and a top sealing device adapted to readily form a spout identifying mark.

The present invention provides a container of the gabled roof type having a top seal rib and a spout identifying mark formed on a side face of the rib at an end portion thereof providing a spout, the container being characterized in that the mark comprises cavities and/or protrusions which are tactually perceivable.

The mark on the container of the invention is in the form of cavities and/or protrusions which are tactually perceivable, and can therefore be recognized tactually by a visually handicapped person, readily indicating to the person which end portion of the rib provides the spout.

The invention provides a top sealing device for containers which comprises a pair of sealing jaws, at least one of the sealing jaws having a sealing face provided with mark-forming recesses and/or projections.

The top sealing device of the invention is adapted to form the top seal rib and the mark at the same time. Accordingly, the mark can be formed easily without entailing a cost increase.

DESCRIPTION OF THE PREFERRED EMBODIMENTS

Embodiments of the present invention will be described below with reference to the drawings.

Figure 1:
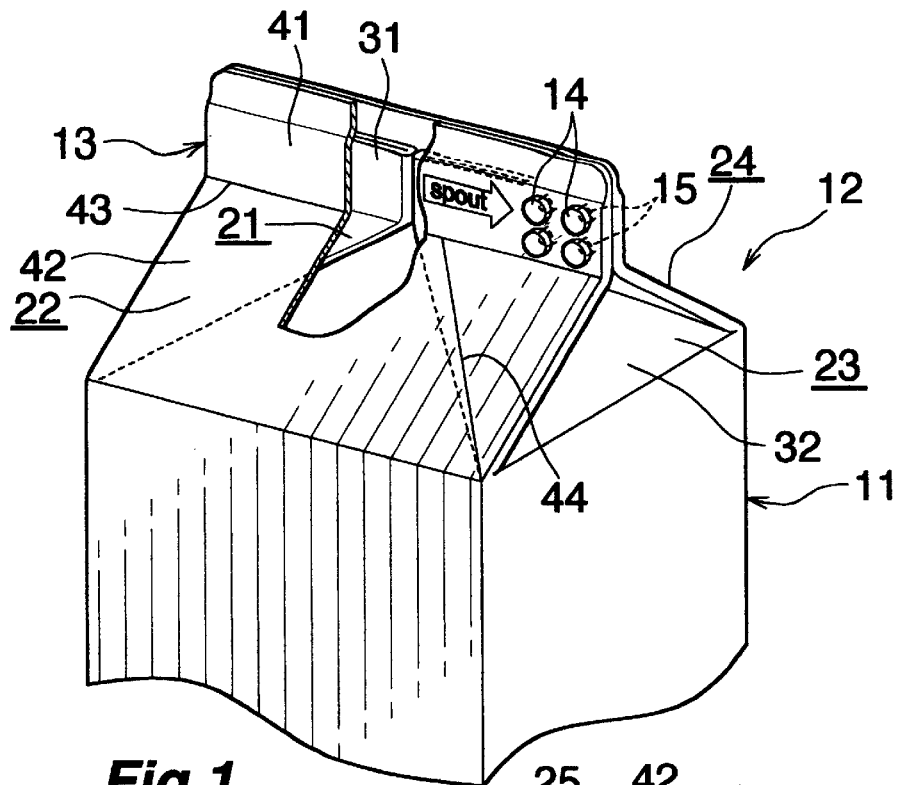
FIG. 1 is a perspective view of a container of the invention.

With reference to FIG. 1, the illustrated container is prepared from a blank of paper-base laminate having a heat seal layer on opposite surfaces, and has a trunk portion 11 in the form of a square tube and a top portion 12 in the form of a gabled roof. The part of the top portion 12 corresponding to the ridge of the roof has a top seal rib 13. The rib 13 is formed by heat-sealing lapped portions of the container blank. The portion of the rib 13 from the midportion of its length to the rib end closer to the right-hand side of FIG. 1 is given a reduced sealing strength so as to provide a spout when opened. The end part of this portion is formed with four protrusions 14 on side face thereof. The other side face of the end part is formed with four cavities 15 in corresponding complementary relation with the respective protrusions.

Figure 2:
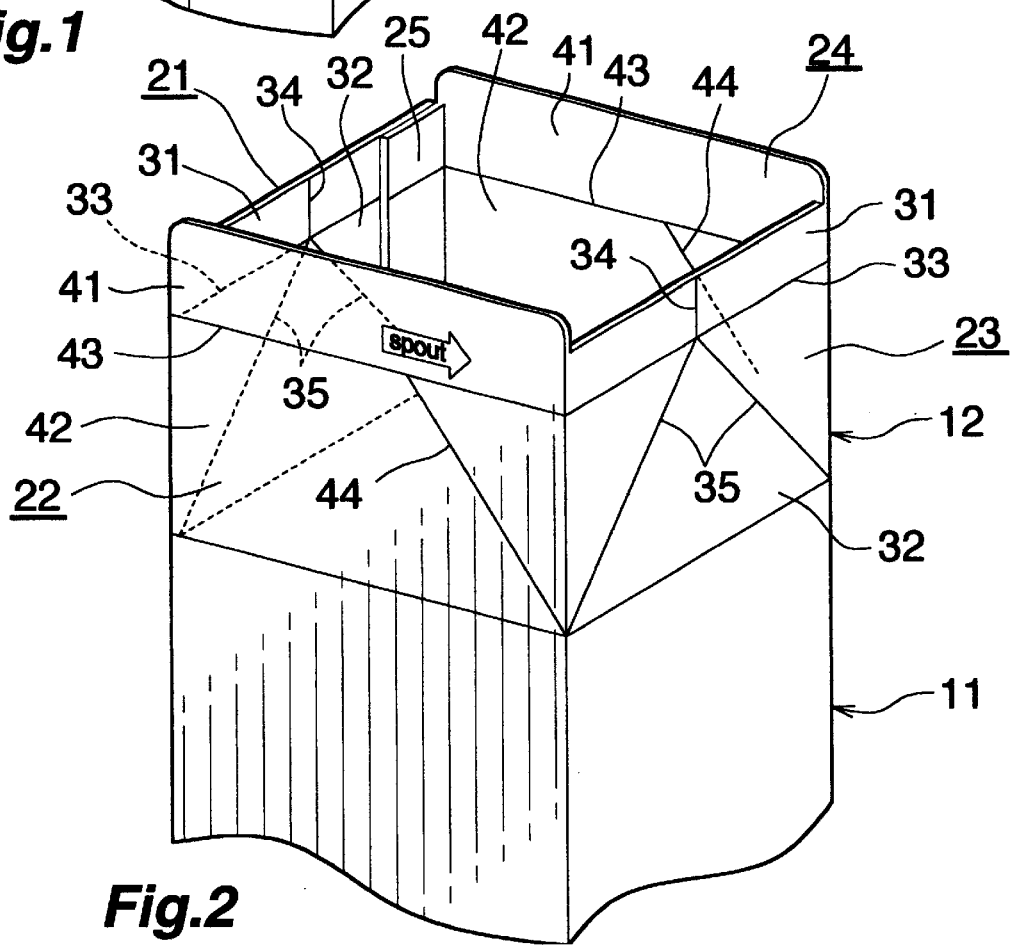
FIG. 2 is a perspective view of the container before the top portion thereof is closed.

FIG. 2 shows the top portion 12 before being closed. The top portion 12 comprises first to fourth rectangular top panels 21 to 24 arranged in this order counterclockwise when seen from above and joined to one another, and a striplike fifth top panel 25 joined to the free edge of the fourth top panel 24 and lapped over and joined to the inner surface of the first top panel 21.

Since the first top panel 21 and the third top panel 23 are of the same structure, the third top panel 23 which is apparently shown will be described. The third top panel 23 comprises an upper inside rib panel portion 31, and a lower inside top panel portion 32, with a horizontal score 33 formed at the boundary between the panel portions 31, 32. The inside rib panel portion 31 is formed with a vertical score 34 extending upward from the midportion of length of the horizontal score 33. The inside top panel portion 32 is formed with an inverted V-shaped score 35 extending downward obliquely in opposite directions from the lower end of the vertical score 34. The second top panel 22 and the fourth top panel 24 are also of the same construction. With reference to FIG. 2, the second top panel 22 which appears closer to the viewer will be described. The second top panel 2 comprises an upper outside rib panel portion 41, and a lower outside top panel portion 42, and is divided into these panel portions 41, 42 by a horizontal score 43 continuous with the horizontal score 33 of the third top panel 23. The panel portion 42 has a slanting score 44 positioned close to the third top panel 23. The inside rib panel portion 31 has a smaller height than the outside rib panel portion 41.

To close the top portion 12, the first to fourth top panels 21 to 24 are folded together with the fifth top panel 25 so that the first and third panels 21, 23 will be positioned inside the second and fourth panels 22, 24. The inside rib panel portions 31 of the first and third top panels 21, 23 are folded in two and held between the outside rib panel portions 41 of the second and fourth top panels 22, 24, whereby the outside rib panel portions 41 are lapped over the inside rib panel portions 31, and the assembly is heat-sealed to form the rib 13.

The rib 13 has a lower part which has four times the thickness of the container blank, and an upper part which has twice the thickness of the container blank. This means that the part of the fourfold thickness is formed by the inside rib panel portions 31 and the outside rib panel portions 41, and that the part of the twofold thickness is formed only by the outside rib panel portions 41. The fifth top panel 25 has an upper end portion extending into the rib 13. This portion only has five times the thickness of the container blank. The four protrusions 14 and cavities 15 are positioned in the part having four times the thickness of the container blank. The part of the twofold thickness may be formed with such protrusions 14 and cavities 15.

The protrusions 14 and cavities 15 are so sized as to be fully perceivable tactually by a visually handicapped person when the container is held by his hand.

To open the container, the rib portion of reduced sealing strength is torn apart, and the third top panel 23 is pulled out toward the user, whereby an opening is formed.

Figure 3:
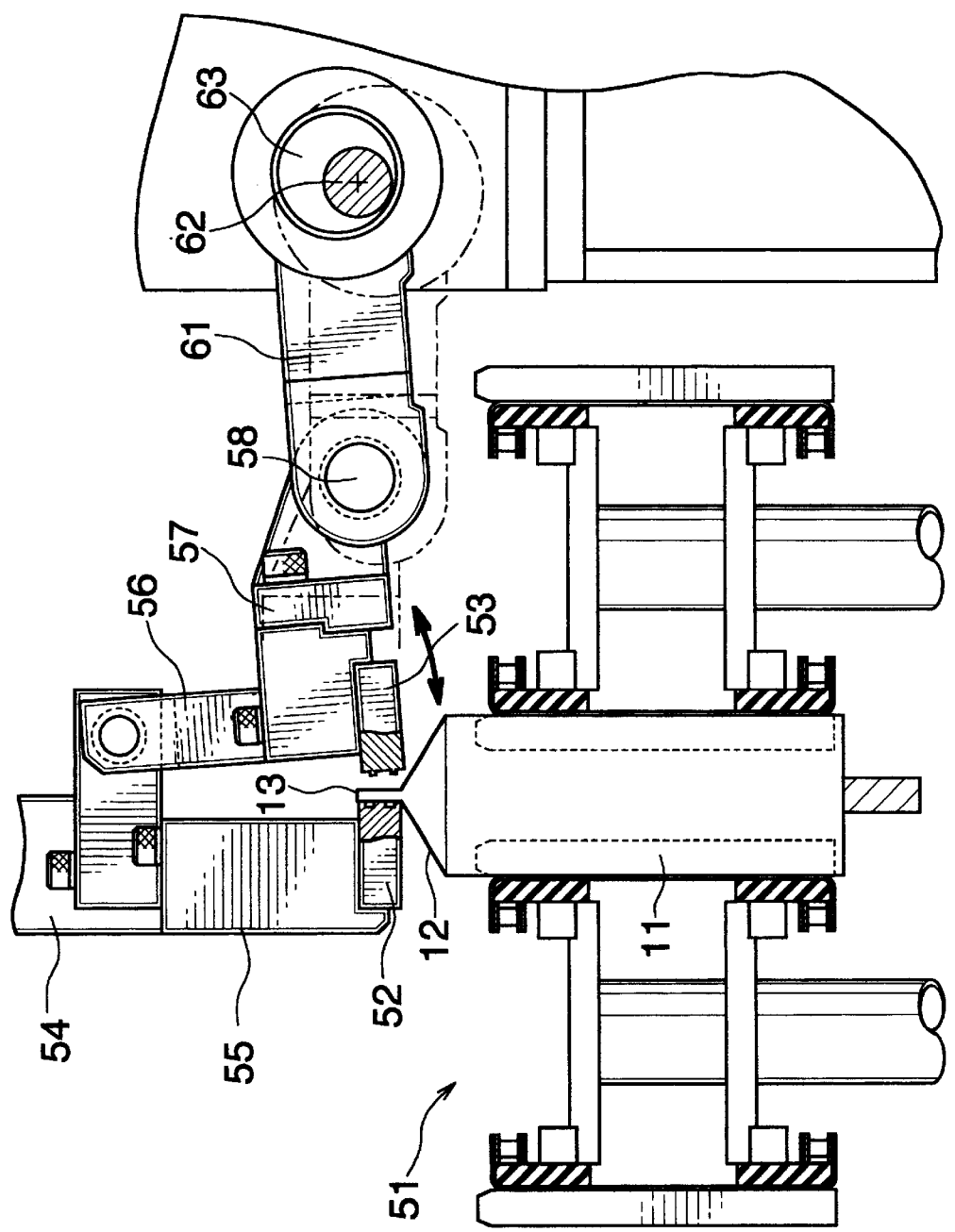
FIG. 3 is a front view of a top sealing device of the invention.

FIG. 3 shows a top sealing device for containers, which is disposed at an intermediate portion of the path of transport of a container conveyor 51. The device has a fixed sealing jaw 52 and a movable sealing jaw 53 arranged at opposite sides of a path of travel of the rib.

The fixed sealing jaw 52 is suspended by a fixed arm 55 from a support member 54 which is fixedly provided above the container transport path. A movable arm 56 is pivoted to the support member 54 upwardly and downwardly movably and has the movable sealing jaw 53 attached to its lower end. The movable arm 56 is provided with a horizontal pin 58 as supported thereon by a bracket 57. A connecting rod 61 has one end fitted to the pin 58 and the other end fitted to an eccentric ring 63 mounted on a drive shaft 62.

When the drive shaft 62 is rotated, the eccentric mechanism pivotally moves the arm 56, moving the movable sealing jaw 53 toward and away from the fixed sealing jaw 52. When the movable sealing jaw 53 is moved toward the fixed jaw 52, a sealing pressure is produced between the jaws 52, 53.

Figure 4:
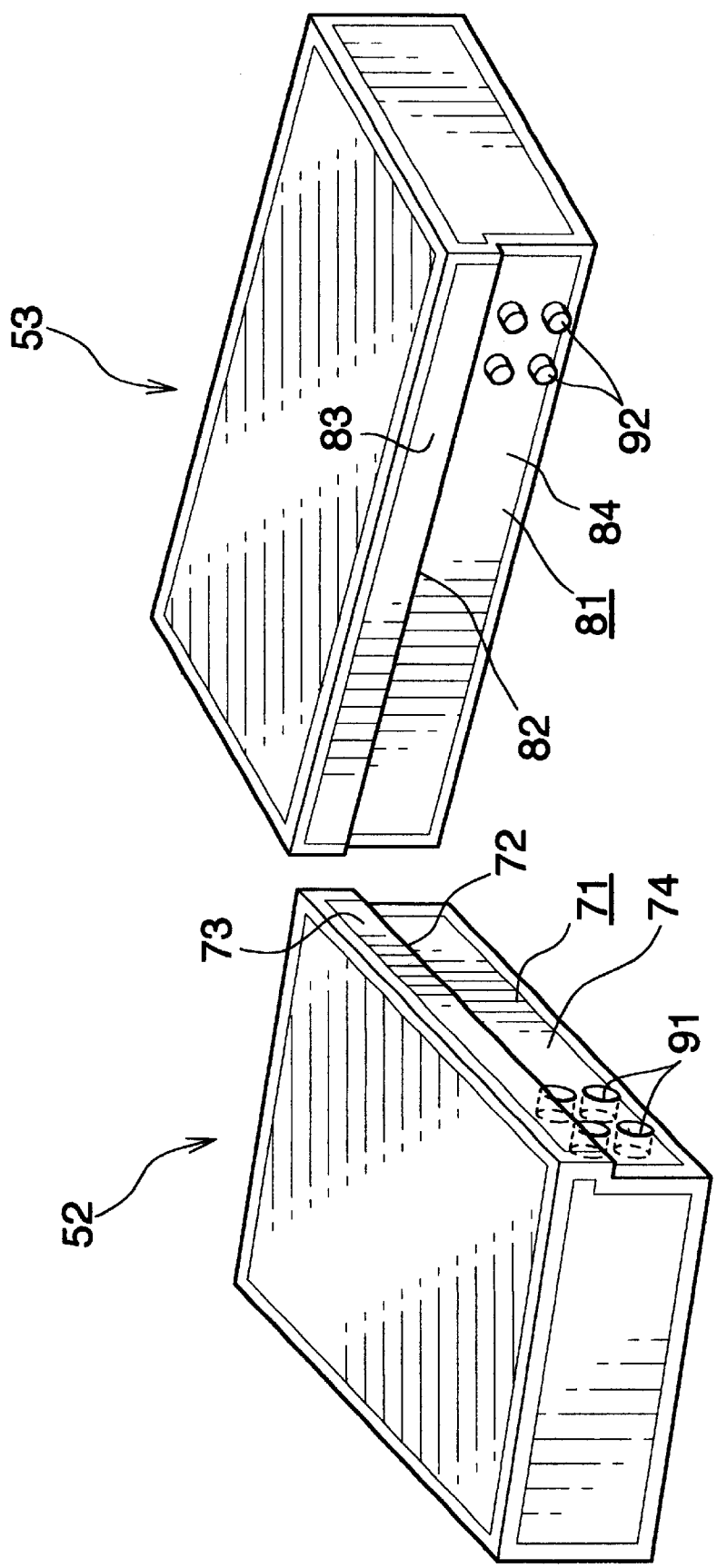
FIG. 4 is a perspective view of sealing jaws of the top sealing device.

FIG. 4 shows the fixed sealing jaw 52 and the movable sealing jaw 53 in detail. The fixed jaw 52 has a sealing surface 71 comprising an upper sealing face 73 and a lower sealing face 74, with a stepped portion 72 formed therebetween. The lower sealing face 74 is retracted from the upper sealing face 73 by an amount corresponding to the difference in thickness between the rib part of the fourfold thickness and the rib part of the twofold thickness. The movable sealing jaw 53 has a sealing surface 81 which, like the sealing surface 71 of the fixed jaw 52, comprises an upper sealing face 83 and a lower sealing face 84, with a stepped portion 82 formed therebetween.

The lower sealing face 74 of the fixed jaw 52 is formed with recesses 91 corresponding to the rib protrusions 14 for forming the protrusions 14. The lower sealing face 84 of the movable jaw 53 is formed with projections 92 corresponding to the rib cavities 15 for forming the cavities 15.

A sealing pressure is produced between the fixed jaw 52 and the movable jaw 53 to seal the rib 13 and, at the same time, to form the protrusions 14 and cavities 15 on the rib 13.

Although the rib 13 has four protrusions 14 and four cavities 15 according to the above embodiment, such portions need not always be four in number. For example, the rib 13 may be marked with braille characters meaning "spout."

The spout identifying mark may be provided by the cavities 15 or protrusions 14 only, whereas it is difficult to form the protrusions 14 only, while if the cavities 15 only are formed, the mark is difficult to perceive tactually.

When the protrusions 14 and the cavities 15 are formed on opposite sides of the rib in corresponding complementary relation using a sealing jaw having projections 92 and a sealing jaw having recesses 91, the protrusions 14 can be formed distinctly by the action of the projections 92 of the jaw.

Although only one of the sealing jaws is movable in the above embodiment, also known is a device wherein two sealing jaws are both movable (see JP-A No. 10-246309). The present invention is applicable also to such a device.

What is claimed is:

1. A gabled container top comprising opposed side faces, a top seal rib and a spout identifying mark formed on the opposed side faces of the rib at an end portion of said rib where a spout is formed wherein the mark comprising protrusions on one side and cavities on the other side in corresponding complementary relation with the respective protrusions, said cavities and/or protrusions being tactually perceivable to aid the blind in locating the spout.

* * * * *